United States Patent
Haulin et al.

(10) Patent No.: US 12,318,929 B2
(45) Date of Patent: Jun. 3, 2025

(54) ROBOT AND ASSEMBLY METHOD THEREOF

(71) Applicant: ABB Schweiz AG, Baden (CH)

(72) Inventors: Jonas Haulin, Shanghai (CN); Hao Gu, Shanghai (CN); Tao Feng, Shanghai (CN); Kangjian Wang, Shanghai (CN)

(73) Assignee: ABB Schweiz AG, Baden (CH)

( * ) Notice: Subject to any disclaimer, the term of this patent is extended or adjusted under 35 U.S.C. 154(b) by 69 days.

(21) Appl. No.: 17/624,686

(22) PCT Filed: Jul. 24, 2019

(86) PCT No.: PCT/CN2019/097395
§ 371 (c)(1),
(2) Date: Jan. 4, 2022

(87) PCT Pub. No.: WO2021/012200
PCT Pub. Date: Jan. 28, 2021

(65) Prior Publication Data
US 2022/0258332 A1   Aug. 18, 2022

(51) Int. Cl.
*B25J 9/00* (2006.01)
*B25J 9/10* (2006.01)

(52) U.S. Cl.
CPC ............... *B25J 9/106* (2013.01); *B25J 9/102* (2013.01); *B25J 9/104* (2013.01)

(58) Field of Classification Search
CPC ... B25J 9/106; B25J 9/102; B25J 9/104; B25J 19/007
See application file for complete search history.

(56) References Cited

U.S. PATENT DOCUMENTS

| 5,203,748 A | 4/1993 | Sawada et al. |
| 2011/0100146 A1 | 5/2011 | Feng |
| 2013/0036851 A1 | 2/2013 | Kitahara et al. |

FOREIGN PATENT DOCUMENTS

| CN | 101264604 A | 9/2008 | |
| CN | 101758497 A | 6/2010 | |
| CN | 104626129 A | 5/2015 | |
| CN | 107284541 A | * 10/2017 | ........... B62D 55/065 |
| CN | 108312134 A | 7/2018 | |
| CN | 208645329 U | * 3/2019 | |

(Continued)

OTHER PUBLICATIONS

English Translation of Wang, CN-107284541-A (Year: 2017).*

(Continued)

*Primary Examiner* — Victor L MacArthur
(74) *Attorney, Agent, or Firm* — Greenberg Traurig, LLP (57) ABSTRACT

Embodiments of the present disclosure provide a robot. The robot arm link includes a first arm link; a hollow shaft extending along a first axis thereof and coupled to the first arm link; a first stage reduction assembly coupled to a power source of the robot; and a second stage reduction assembly comprising: an input coupled to an output of the first stage reduction assembly and adapted to rotate about a second axis offset from the first axis; and an output coaxially arranged on a periphery of the hollow shaft and adapted to engage with the input to cause a rotation of the first arm link via the hollow shaft.

8 Claims, 7 Drawing Sheets

(56) References Cited

FOREIGN PATENT DOCUMENTS

| | | |
|---|---|---|
| CN | 109227597 A | 6/2019 |
| EP | 1970171 A1 | 9/2008 |

OTHER PUBLICATIONS

English Translation of Pei CN-208645329-U (Year: 2019).*
International Search Report and Written Opinion, issued by the ISA/CN National Intellectual Property Administration, recarding corresponding patent application Serial No. PCT/CN2019/097395; Apr. 23, 2020; 8 pages.
Fundamentals of Industrial Robot Technology Module: Basic Application of Industrial Robotics; 4 pages.
Fundamentals of Mechanical Design / Chen Lan, ed. 1. Beijing Institute of Technology Press, Jul. 2012 ISBN 978-7-5640-6298-9; 6 pages.
Mechanical Foundation, Jun. 2003; ISBN 88408-436-8; 7 pages.

* cited by examiner

ROBOT AND ASSEMBLY METHOD THEREOF

CROSS-REFERENCE TO RELATED APPLICATIONS

This application is a national stage of International Patent Application Serial No.: PCT/CN2019/097395, filed on Jul. 24, 2019; and which is herein incorporated by reference in its entirety.

FIELD

Embodiments of the present disclosure generally relate to a robot as well as an assembly method thereof.

BACKGROUND

Cables which are typically arranged in arm links of the robot are vital components working in industrial robots. Because the arm links of the robot typically rotate around a joint, how to route the cable to prevent the cable from affecting rotation range of the robot arm link and prevent premature failure of the cable is a challenge in robot design. Even for static cables, due to problems such as space occupation, there is still necessary to consider how to reduce the space occupation of the cables when designing a small robot.

For a high degree of freedom (DOF) manipulator or robot with a centralized controller, it is necessary to route various cables, such as control cables, power cables, and signal transmission cables or the like from the controller located at a base to an end effector of the robot. At least for ease of the cable routing of a robot, especially for the high-DOF robot, the robot with hollow shafts has been developed. The hollow shaft allows cables to pass therethrough for routing.

To meet the strength requirement and to route more cables in the hollow shaft, the robot with hollow shafts typically have a large volume. As a result, in order to reduce the volume of the robot as much as possible while achieving a suitable reduction ratio, a relatively expensive and a single-stage transmission mechanism is generally required between a power source and the hollow spindle. Such transmission mechanisms are typically highly integrated and can only be replaced entirely after damage, resulting in high manufacturing and maintenance costs for the robot.

SUMMARY

In order to address or at least partially address the above and other potential problems, embodiments of the present disclosure provide a robot with a two-stage transmission assembly to drive a hollow shaft and associated assembly method.

In a first aspect, a robot is provided. The robot arm link comprises a first arm link; a hollow shaft extending along a first axis thereof and coupled to the first arm link; a first stage reduction assembly coupled to a power source of the robot; and a second stage reduction assembly comprising: an input coupled to an output of the first stage reduction assembly and adapted to rotate about a second axis offset from the first axis; and an output coaxially arranged on a periphery of the hollow shaft and adapted to engage with the input to cause a rotation of the first arm link via the hollow shaft.

By using the above mentioned two-stage transmission assembly between the power source and the hollow shaft, the hollow shaft can be driven by off-the-shelf components with relatively low costs. Furthermore, as it is only necessary to replace or maintain the damaged gear stage without having to replace the entire drive train, maintenance will be more convenient and less costly.

In some embodiments, the first stage reduction assembly comprises a gearhead coupled to an output shaft of the power source. By arranging a gearhead with low cost to the output shaft of the power source, the costs of assembly and maintenance can be further reduced.

In some embodiments, the robot further comprises at least one bearing arranged on the periphery of the hollow shaft. In this way, the hollow shaft can be better supported to improve the stability of the robot.

In some embodiments, the robot further comprises a second arm link connected to the first arm link via the hollow shaft, and wherein the hollow shaft and the first and second stage reduction assemblies are partially arranged in one of the first and second arm links. As a result, the hollow shaft and the first and second stage reduction assemblies can be arranged in the robot arm link to be driven to rotate or a further robot arm link coupled to the robot arm link to be driven as needed, thereby increasing flexibility in component arrangement and further reducing the cost and volume.

In some embodiments, the second stage reduction assembly further comprises a belt via which the input and the output are engaged with each other. By using the belt as the second stage reduction assembly, the assembly and maintenance costs can be further reduced while reducing vibration between components in the robots.

In some embodiments, the belt comprises a synchronous belt. As a result, the stability of the transmission and even the robot can be further improved.

In some embodiments, the input and the output comprise spur gears or bevel gears. That is, the second stage reduction assembly may also adopt a gear transmission system, improving the flexibly of the robot assembly and maintenance.

In some embodiments, the hollow shaft is coupled to the first arm link via a keyway structure or screws, or the hollow shaft and the first arm link are integrally formed. This arrangement may prevent relative rotation between the first arm link and the hollow shaft, thereby improving the stability of the robots.

In some embodiments, the hollow shaft and the output component are integrally formed or assembled by interference fit or screw pressing. In this way, the flexibly of the robot assembly and maintenance can be further improved.

In second aspect, an assembly method of a robot is provided. The method comprises providing a first arm link; providing an hollow shaft extending along a first axis and coupled to the first arm link; providing a first stage reduction assembly coupled to a power source; and providing a second stage reduction assembly comprising: an input coupled to an output of the first stage reduction assembly to rotate about a second axis offset from the first axis; and an output coaxially arranged on a periphery of the hollow shaft and adapted to engage with the input to cause a rotation of the first arm link via the hollow shaft.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, same reference numerals usually represent same components.

Throughout the drawings, the same or similar reference symbols are used to indicate the same or similar elements.

DETAILED DESCRIPTION

The present disclosure will now be discussed with reference to several example embodiments. It is to be understood these embodiments are discussed only for the purpose of enabling those skilled persons in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

Robots are currently used in more and more fields. Components, such as controllers, sensors and end effectors are typically coupled with each other with cables. In robots, cables are key components of a robot. Because the arm links of the robot typically rotate around a joint, how to route the cable to prevent the cable from affecting rotation range of the robot arm link and prevent premature failure of the cable is a challenge in robot design. Even for static cables, due to problems such as space occupation, there is still necessary to consider how to reduce the space occupation of the cables when designing a small robot.

To facilitate the control of a robot and improve the stability of the robot, some robots are controlled by a centralized controller. For a high degree of freedom (DOF) manipulator or robot with the centralized controller, there are a large number of cables to be routed from the controller to the end effector for transmission of control signals, sensor signals or power or the like. At least for ease of the cable routing of a robot, especially for the high-DOF robot, the robot with hollow shafts has been developed. The hollow shaft allows cables to pass therethrough for routing.

However, to achieve a suitable reduction ratio, the hollow shaft in the conventional robot is generally disposed at the input or the intermediate portion of the transmission system. Cables also need to be protected from damage when routing cables due to a relatively high rotation speed of the input or the intermediate portion. Furthermore, to meet the strength requirement and to route more cables in the hollow shaft, the hollow shafts typically have a large volume, resulting in a large volume of the robots.

On the other hand, the development of cheap robots and small and light robots gradually becomes a development trend of the robot field. In order to reduce the volume of the robot as much as possible while achieving the suitable reduction ratio, a relatively expensive and a single-stage transmission mechanism is generally required between a power source and the hollow spindle. Such transmission mechanisms are typically highly integrated and can only be replaced entirely after damaged, resulting in high manufacturing and maintenance costs for the robot.

In order to solve or at least partially solve the above and other potential problems, embodiments of the present disclosure provide a robot comprising a two-stage reduction assembly to drive a hollow shaft. Now some example embodiments will be described with reference to FIGS. 1-6.

Figure 1:
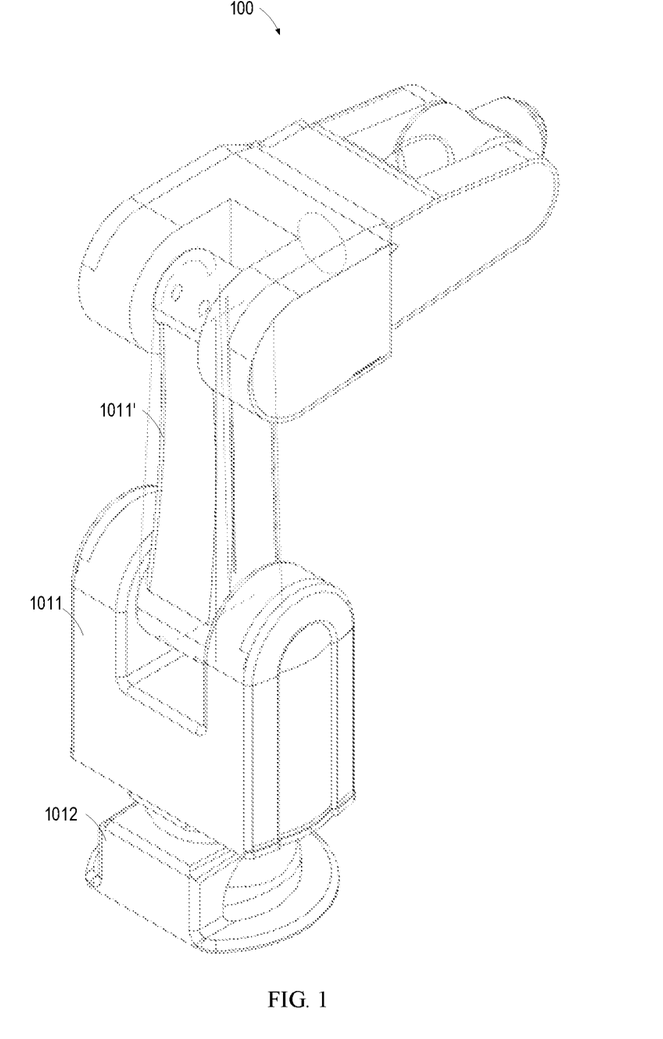
FIG. 1 shows a perspective view of a robot according to embodiments of the present disclosure.
Figure 2:
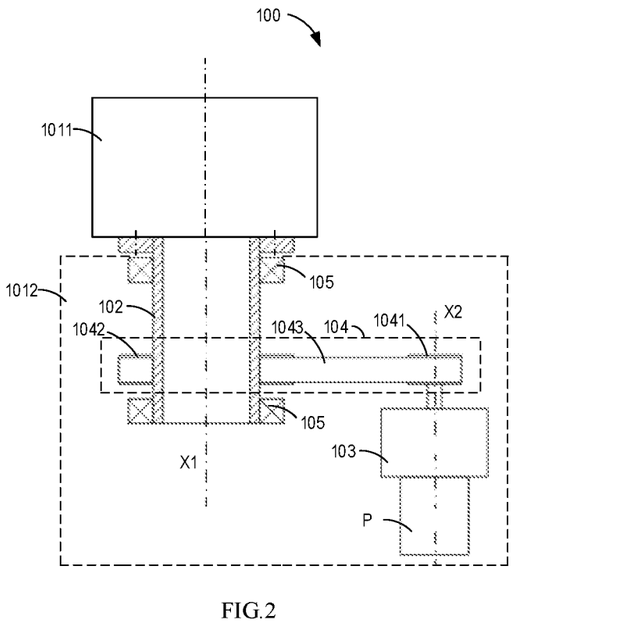
FIG. 2 shows a schematic diagram of a joint portion of a robot according to embodiments of the present disclosure.

FIG. 1 shows a perspective view of a robot 100 and FIG. 2 shows a schematic diagram of a joint portion of the robot 100 according to embodiments of the present disclosure. As shown, generally, the robot 100 comprises at least one arm link, a hollow shaft 102 and a two-stage reduction assembly 103 between a power source P, such as a motor or the like, and the hollow shaft 102. The arm link 100 herein refers to a main structure of a robot, such as a robot arm, a base, a wrist, or even end-effectors. Also, the arm link 100, as the main structure of the robot, may be of any suitable shapes to meet the requirements of the robot.

For the convenience of description and in order to distinguish the different arm links of a robot, the arm links hereafter will be referred to as a first arm link 1011, a second arm link 1012 or the like. It is to be understood that "first" and "second" are only used to distinguish different arm links, which have no difference in structure and function, and can be interchanged in the following embodiments.

Figure 3:
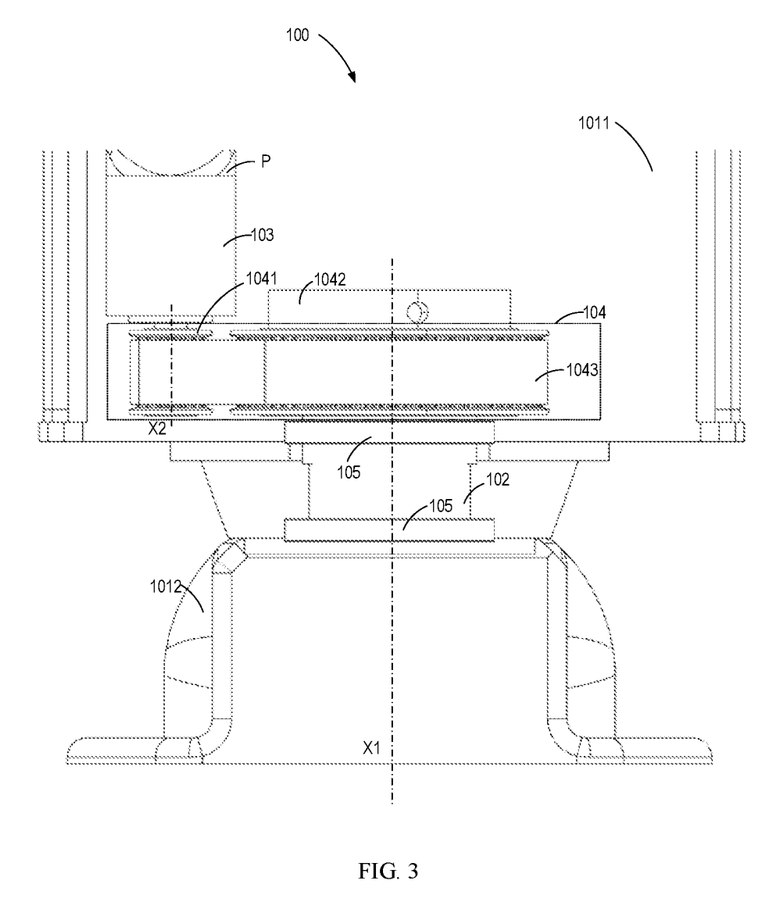
FIG. 3 shows a front view of a joint portion of a robot according to embodiments of the present disclosure.
Figure 4:
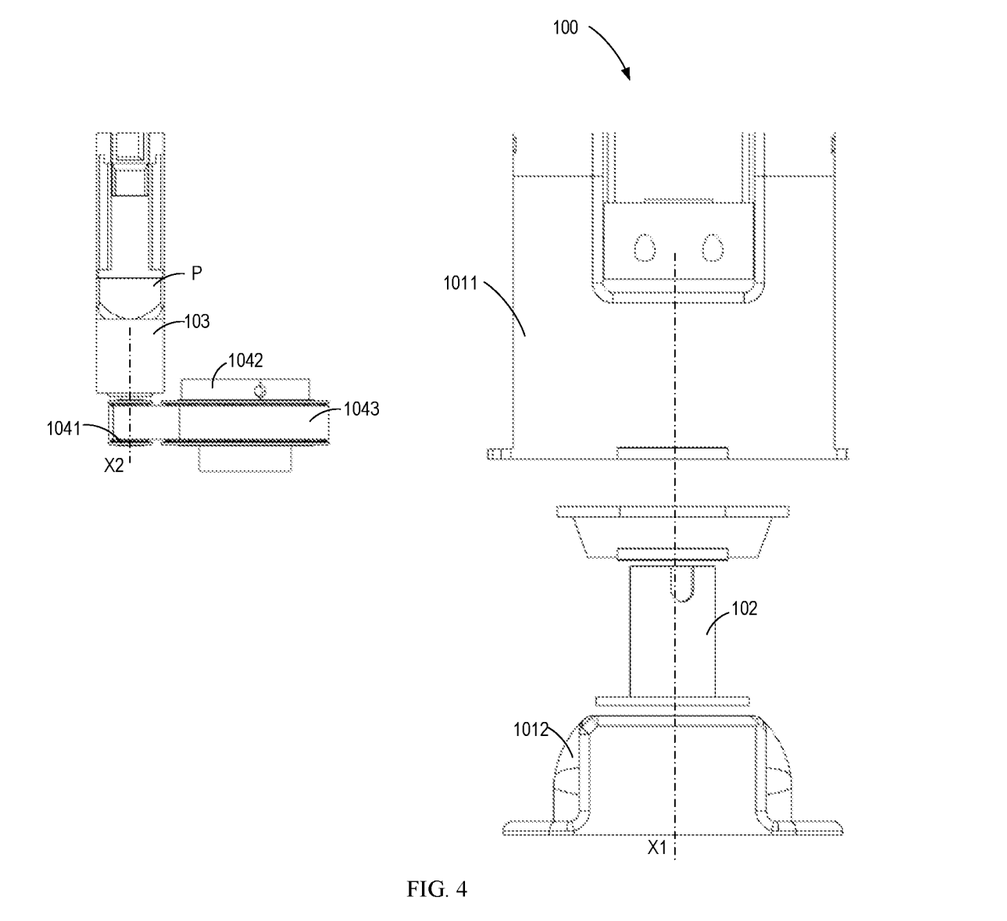
FIG. 4 shows an exploded front view of a joint portion of a robot according to embodiments of the present disclosure.

The hollow shaft 102 extends along its axis (referred to as a first axis X1 for ease of discussion) and coupled to the first arm link 1011. "Coupling" here means that the first arm link 1011 can be driven to rotate by the hollow shaft 102. For example, in some embodiments, the hollow shaft 102 along with the first and second stage reduction assemblies 103, 104 may be at least partially arranged in the first arm link 1022 to be driven by the hollow shaft 102, as shown in FIGS. 2, 3 and 4. In some alternative embodiments, the hollow shaft 102 as well as the first and second stage reduction assemblies 103, 104 may also be at least partially arranged outside of the first arm link 1022.

Figure 5:
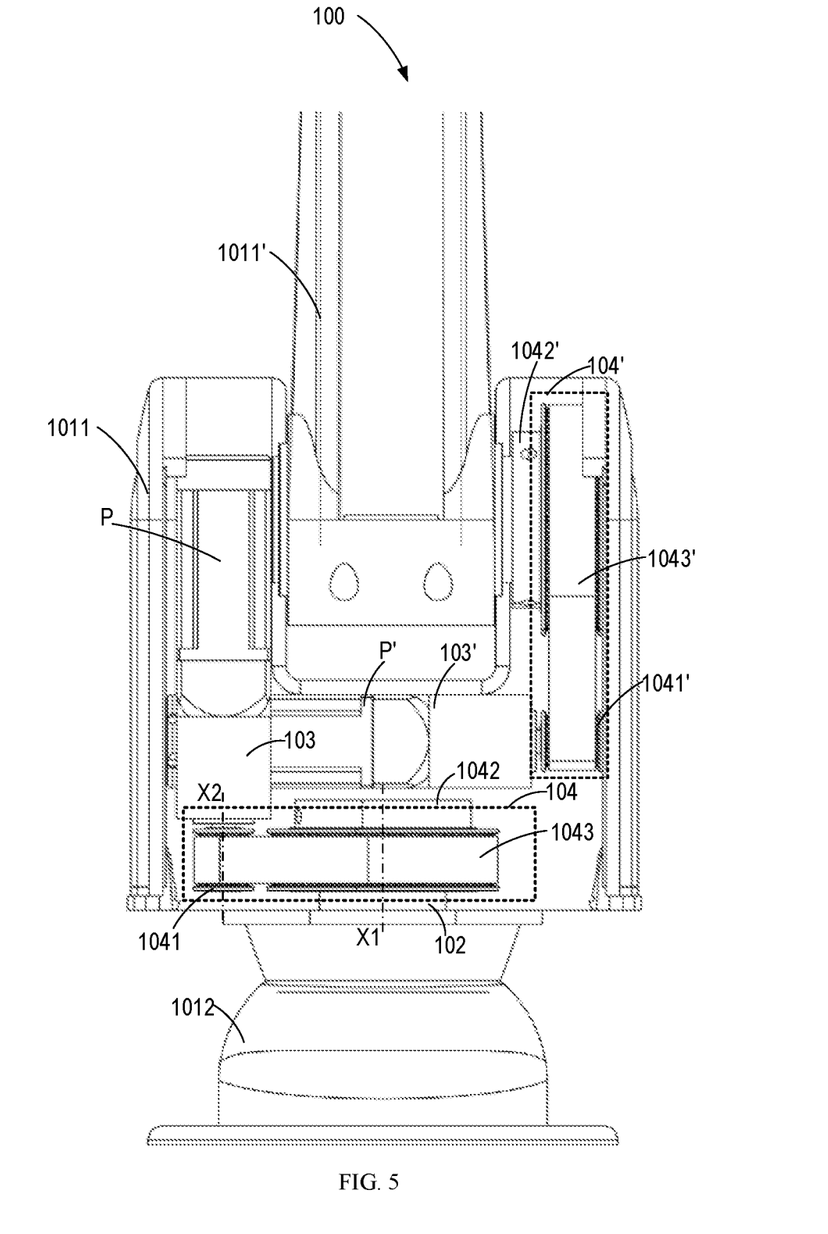
FIG. 5 shows a front view of a joint portion of a robot according to further embodiments of the present disclosure.
Figure 6:
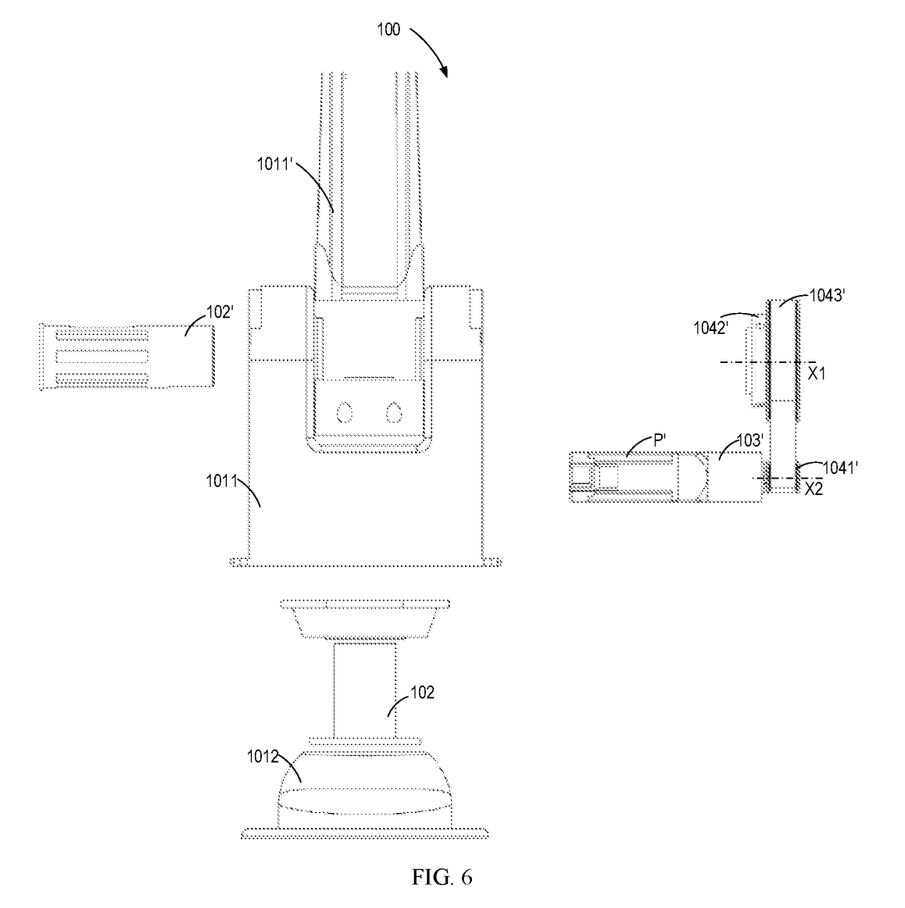
FIG. 6 shows an exploded front view of a joint portion of a robot according to further embodiments of the present disclosure.

For example, the hollow shaft 102 as well as the first and second stage reduction assemblies 103, 104 may also be at least partially arranged in a further arm link, i.e., the second arm link 1012, which is not the one driven to rotate by the hollow shaft 102, as shown in FIGS. 5 and 6. That is, the hollow shaft 102 as well as the first and second stage reduction assemblies 103, 104 may be arranged at any suitable position, such as inside or outside the arm link which is driven by the hollow shaft 102.

In other words, the hollow shaft 102 as well as the first and second stage reduction assemblies 103, 104 may also be at least partially can be at least partially arranged in the robot arm link to be driven to rotate or a further robot arm link coupled to the robot arm link to be driven as needed, thereby increasing flexibility in component arrangement and thus making the internal layout of the robot 100 more reasonable.

In some alternative embodiments, the hollow shaft 102 and the first and second stage reduction assemblies 103, 104 may also be arranged in different arm links. For example, the hollow shaft 102 may be arranged in the first arm link 1011 while the first and second stage reduction assemblies 103, 104 may be arranged in the second arm link 1012.

The two-stage reduction assembly comprises a first stage reduction assembly 103 and a second stage reduction assembly 104, as shown in FIG. 2. The first stage reduction assembly 103 is coupled to the power source P. In some embodiments, the first stage reduction assembly 103 may be a gearhead coaxially coupled to an output shaft of the power source P.

The gearhead, such as a planetary gearhead, is a proven and inexpensive transmission that can be accessible commercially. By coaxially coupling the gearhead to the output shaft of the power source P, the speed of the output shaft can be reduced in a cost effective manner.

It is to be understood that the first stage reduction assembly 103 may be a planetary gearhead coaxially coupled to the output shaft of the power source P in the above embodiments is merely for illustration, without suggesting any limitations as to the scope of the present disclosure. Any other suitable arrangements or structures are possible as well. For example, in some embodiments, the gearhead may also be a cycloidal gearhead or a harmonic gearhead or the like. In some alternative embodiments, the output of the first stage reduction assembly 103 and the output shaft of the power source P may also be arranged at a non-zero angle.

The second stage reduction assembly 104 comprises an input 1041 and an output 1042, as shown in FIGS. 2 and 3. The input 1041 coupled to an output of the first stage reduction assembly 103 and thus can be driven to rotate about an axis (referred to as a second axis X2) by the output of the first stage reduction assembly 103. The second axis X2 is offset from the first axis X1.

Although FIGS. 2-6 shows that the first axis X1 is parallel to the second axis X2, it is to be understood that "offset" herein may also mean that the first axis X1 is angled relative to the second axis X2. That is, the first axis X1 may be at a non-zero angle with respect to the second axis X2. This arrangement may further increase flexibility in component arrangement of a robot 100, and thus allow the layout of the robot 100 to be more reasonable.

The output 1042 of the second stage is coaxially arranged on a periphery of the hollow shaft 102. "Arranged on a periphery" may mean that the output 1042 may be arranged on the outer circumference of the hollow shaft itself. For example, in some embodiments, the output 1042 may be sleeved on the hollow shaft 102 by interference fit or may be integrally formed on the hollow shaft 102 by injection molding. This arrangement can reduce the manufacturing cost of the hollow shaft 102 and the output 1042 while improving connection performance between the hollow shaft 102 and the output 1042.

In some embodiments, "arranged on a periphery" may also mean that the output 1042 may be arranged on an extended profile of the hollow shaft 102. That is, the output 1042 may be fixed to one end of the hollow shaft 102, as shown in FIGS. 4 and 6, by any suitable means, such as interference fit or screw pressing. This arrangement allows the hollow shaft 102 and the output 1042, which are separated parts, can be separately replaced if damaged, thereby further reducing the maintenance cost of the robot 100. In those embodiments, the output 1042 may also be integrally formed on the end of the hollow shaft 102 by injection molding.

The output 1042 can engage with the input 1041 in a suitable manner to cause a rotation of the first arm link 1011 via the hollow shaft 102. That is, the input 1041 and the output 1042 may be any suitable structures or structures that can engage with each other to achieve transmission.

For example, in some embodiments, as shown in FIGS. 2-6, the input 1041 and the output 1042 may be pulleys for a belt arranged thereon. In those embodiments, the robot 100 may further comprise a belt 1043, via which the input 1041 and the output 1042 engage with each other. In other words, the second stage reduction assembly in those embodiments adopts a belt transmission.

The belt transmission is a proven and low-cost transmission. As can be seen from the above that the two-stage reduction assembly of the robot 100 herein both adopt low-cost transmissions to reach a required reduction ratio, thereby reducing the assembly cost of the robot 100.

Furthermore, the first stage reduction assembly 103 and the second reduction assembly 104 are assembled separately, which allows they can be replaced or repaired if damaged, thereby reducing the maintenance cost of the robot 100. In addition, two-stage reduction assembly allows the transmission of the arm links can be arranged in one arm link, as shown in FIG. 5.

Specifically, in some embodiments, there are three arm links 1011, 1011' and 1012 of the robot 100 that are shown in FIGS. 5 and 6. As shown, the first arm link 1011 is driven by the power source P via the first stage reduction assembly 103 and the second stage reduction assembly 104, i.e., the input 1041, the output 1042 and the belt 1043, and the hollow shaft 102. Similarly, another first arm link 1011' coupled the first arm link 1011 is driven by the power source P' via the first stage reduction assembly 103' and the second stage reduction assembly 104', i.e., the input 1041', the output 1042' and the belt 1043', and the hollow shaft 102'.

As can be seen in the FIG. 5, the first stage reduction assembly 103 and the second stage reduction assembly 104 along with the first stage reduction assembly 103' and the second stage reduction assembly 104' are all arranged in the first arm link 1011. This arrangement achieves a more compact and reasonable internal layout of the robot 100, while making the rotation of the first arm link 1011' more flexible.

To allow the above arrangement, the hollow shaft 102 may be arranged in the arm link in any suitable manners. For example, in some embodiments, as shown in FIG. 4, the hollow shaft 102 may be coaxially coupled to the first arm link 1011. In some alternative embodiments, the hollow shaft 102 may be arranged in a further arm link with an axis being perpendicular to the first arm link 100 to be driven by the hollow shaft 102.

The further arm link for receiving the hollow shaft 102 may adopt any suitable structure that allows the above arrangement. For example, as shown in FIG. 6, the arm link 1011 for receiving the hollow shaft 102 to drive another arm link 1011' may have a U-shaped structure. The arm link 1011' to be driven by the hollow shaft 102 and the hollow shaft 102 may be arranged between vertical branches of the U-shaped structure.

In addition, with the above arrangement, as the hollow shaft 102 are at the output side of the transmission, the cables can pass through the hollow shaft 102 without extra protection due to a relatively low speed of the output side, thereby reducing the assembly and maintenance efforts and costs of the robot 100.

In some embodiments, to better support the hollow shaft 102 in the first or second arm link 1011, 1012, at least one bearing 105 may be arranged on the periphery of the hollow shaft 102, as shown in FIG. 2. As shown, there are two bearings 105 that may be arranged at or near the ends of the hollow shaft 105. The bearing 105 may be a relatively low cost deep groove ball bearing capable of withstanding the overturning torque.

Furthermore, the second stage reduction assembly using the belt transmission can reduce the vibration of the robot and thus improves the performance of the robot, especially its joints. In some embodiments, the belt 1043 may be a synchronous belt. By using the synchronous belt, the stability of the transmission and the robot 100 can be further improved.

It is to be understood that the above embodiments where the second stage reduction assembly adopts the belt transmission are merely for illustration, without suggesting any limitations as to the scope of the present disclosure. Any suitable arrangements or structures are possible as well.

For example, in some alternative embodiments, the second stage reduction assembly 104 may also adopt a gear transmission. In those embodiments, the second stage reduction assembly 104 may comprise spur gears or bevel gears engaging with each other. In sum, it can be seen from the above that the second stage reduction assembly 1042 may adopt any suitable transmission means, which can be chosen as needed, thereby improving the flexibly of the robot assembly and maintenance.

In some embodiments, the hollow shaft 102 and the first arm link 1011 to be driven by the hollow shaft 102 are coupled to each other via a keyway structure. For example, in some embodiments, an outer peripheral surface of the hollow shaft 102 may be arranged with a single key groove, and a corresponding portion of the first arm link 1011 that is engaged with the hollow shaft 102 is arranged with a key, as shown in FIG. 4. The key may be received in the key groove, thereby preventing relative rotation between the first arm link 1011 and the hollow shaft 102, and improving the stability of the robot 100.

In some alternative embodiments, a spline groove may be arranged on the outer circumferential surface of the hollow main shaft 102, and a spline may be arranged at a corresponding portion of the first arm link 1011 that cooperates with the hollow main shaft 102, as shown in FIG. 6. This arrangement can further improve the stability of the robot 100.

It is to be understood that the above embodiments where the hollow shaft 102 is coupled to the first arm link 1011 via the key structure are merely for illustration, without suggesting any limitations as to the scope of the present application. Any other suitable structures or arrangements are possible as well. For example, in some embodiments, the hollow shaft 102 may also be coupled to the first arm link 1011 via screws or the like. In some alternative embodiments, the hollow shaft 102 and the first arm link 1011 may be integrally formed.

It can be seen from the above that with the two-stage reduction assembly, the robot 100 can adopt the hollow shaft 102 in a low-cost way. Furthermore, as it is only necessary to replace or maintain the damaged gear stage without having to replace the entire drive train, maintenance will be more convenient and less costly. In addition, the hollow shaft 102 is arranged at the output of the transmission, thereby allowing the cables can pass through the hollow shaft 102 without protection, thereby reducing the assembly and maintenance efforts and costs of the robot 100.

Figure 7:
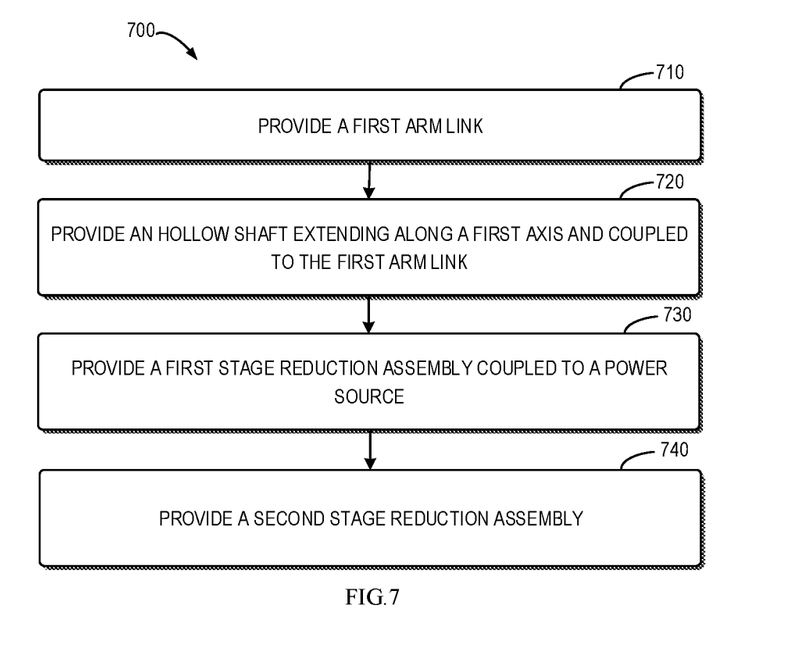
FIG. 7 shows a flowchart illustrating an assembly method of a robot according to embodiments of the present disclosure.

Embodiments of the present disclosure further provide an assembly method of the above mentioned robot 100. FIG. 7 shows a flowchart 700 illustrating an assembly method of a robot 100. As shown, in block 710, a first arm link 1011 is provided. In block 720, a hollow shaft 102 extending along a first axis X1 and coupled to the first arm link is provided.

In block 730, a first stage reduction assembly 103 coupled to a power source is provided. After that, in block 740, a second stage reduction assembly 104 is provided. The second stage reduction assembly 104 comprises an input 1041 and an output 1042. The input 1041 is coupled to an output of the first stage reduction assembly 103 to rotate about a second axis X2 offset from the first axis X1. The output 1042 is coaxially arranged on a periphery of the hollow shaft 102 and can engage with the input 1041 to cause a rotation of the first arm link 1011 via the hollow shaft 102. In this way, the assembly and maintenance difficulties and costs of the robots may be significantly reduced.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. A robot, comprising:
    a first arm link;
    a first hollow shaft extending along a first axis thereof and coupled to the first arm link,
        wherein the first hollow shaft allows for cables to pass therethrough;
    a second arm link connected to the first hollow shaft, the second arm link comprising:
        a first stage reduction assembly extending along a second axis thereof and coupled to a first power source of the robot;
        a second stage reduction assembly comprising:
            an input of the second stage reduction assembly coupled to an output of the first stage reduction assembly,
                wherein the input of the second stage reduction assembly is adapted to rotate about the second axis; and
            an output of the second stage reduction assembly coaxially arranged on a periphery of the first hollow shaft,
                wherein the output of the second stage reduction assembly is adapted to engage with the input of the second stage reduction assembly to cause a rotation of the first arm link about the first axis by driving the first hollow shaft to rotate about the first axis;
        a third stage reduction assembly extending along a third axis thereof and coupled to a second power source of the robot; and
        a fourth stage reduction assembly comprising:
            an input of the fourth stage reduction assembly coupled to an output of the third stage reduction assembly; and
            an output of the fourth stage reduction assembly coaxially arranged on a periphery of a second hollow shaft, wherein the output of the fourth stage reduction assembly is adapted to engage with the input of the fourth stage reduction assembly;

wherein the first axis is offset from the second axis in a direction of the second stage reduction assembly, and wherein the second stage reduction assembly further comprises a belt connected to the input of the second stage reduction assembly and the output of the second stage reduction assembly and via which the input of the second stage reduction assembly and the output of the second stage reduction assembly engage with each other; and a third arm link, wherein the third arm link is coupled to the output of the fourth stage reduction assembly via the second hollow shaft, and wherein the third arm link is driven by the fourth stage reduction assembly via the second hollow shaft to rotate about a fourth axis.

2. The robot of claim 1, wherein the first stage reduction assembly comprises a gearhead coupled to an output shaft of the first power source.

3. The robot of claim 1, further comprising:

at least one bearing arranged on the periphery of the first hollow shaft.

4. The robot of claim 1, wherein the second arm link is connected to the first arm link via the first hollow shaft, and wherein the first hollow shaft and the first stage reduction assembly and the second stage reduction assembly are partially arranged in one of the first arm link and the second arm link.

5. The robot of claim 1, wherein the belt comprises a synchronous belt.

6. The robot of claim 1, wherein the first hollow shaft is coupled to the first arm link via a keyway structure or screws, or the first hollow shaft and the first arm link are integrally formed.

7. The robot of claim 1, the first hollow shaft and the output of the second stage reduction assembly are integrally formed or assembled by interference fit or screw pressing.

8. An assembly method of a robot, comprising:

providing a first arm link;

providing a first hollow shaft extending along a first axis and coupled to the first arm link, wherein the first hollow shaft allows for cables to pass therethrough;

providing a second arm link connected to the first hollow shaft;

providing a first stage reduction assembly extending along a second axis and coupled to a first power source;

providing a second stage reduction assembly comprising:

an input of the second stage reduction assembly coupled to an output of the first stage reduction assembly, wherein the input of the second stage reduction assembly is adapted to rotate about the second axis; and an output of the second stage reduction assembly coaxially arranged on a periphery of the first hollow shaft, wherein the output of the second stage reduction assembly is adapted to engage with the input of the second stage reduction assembly to cause a rotation of the first arm link about the first axis by driving the first hollow shaft to rotate about the first axis;

providing a third stage reduction assembly extending along a third axis thereof and coupled to a second power source of the robot;

providing a fourth stage reduction assembly comprising:

an input of the fourth stage reduction assembly coupled to an output of the third stage reduction assembly; and an output of the fourth stage reduction assembly coaxially arranged on a periphery of a second hollow shaft, wherein the output of the fourth stage reduction assembly is adapted to engage with the input of the fourth stage reduction assembly; and providing a third arm link connected to the fourth stage reduction assembly via second hollow shaft, wherein the third arm link is driven by the fourth stage reduction assembly via the second hollow shaft to rotate about a fourth axis;

wherein the first axis is offset from the second axis in a direction of the second stage reduction assembly; and wherein the second stage reduction assembly further comprises a belt connected to the input of the second stage reduction assembly and the output of the second stage reduction assembly and via which the input of the second stage reduction assembly and the output of the second stage reduction assembly engage with each other.

* * * * *